United States Patent [19]

Bühler et al.

[11] Patent Number: 4,872,883
[45] Date of Patent: Oct. 10, 1989

[54] MIXTURES OF MONOAZO DYESTUFFS

[75] Inventors: Ulrich Bühler, Alzenau; Klaus Hofmann, Frankfurt am Main; Manfred Hähnke, Kelkheim, all of Fed. Rep. of Germany

[73] Assignee: Bayer Aktiengesellschaft, Bayerwerk, Fed. Rep. of Germany

[21] Appl. No.: 149,010

[22] Filed: Jan. 27, 1988

[30] Foreign Application Priority Data

Feb. 2, 1987 [DE] Fed. Rep. of Germany ....... 3702967

[51] Int. Cl.[4] .................... C09B 67/22; C09B 29/08; D06P 1/18
[52] U.S. Cl. .......................... 8/639; 8/531; 8/532; 8/533; 8/638; 8/921; 8/922; 8/924
[58] Field of Search .............................. 8/639

[56] References Cited

U.S. PATENT DOCUMENTS

| | | | |
|---|---|---|---|
| 3,954,395 | 5/1976 | Leverenz | 8/639 |
| 4,105,655 | 8/1978 | Gottschlich et al. | 534/852 |
| 4,237,048 | 12/1980 | Gottschlich et al. | 534/850 |
| 4,381,262 | 4/1983 | Buhler et al. | 534/850 |
| 4,430,090 | 2/1984 | Buhler et al. | 8/508 |
| 4,689,050 | 8/1987 | Hahnke et al. | 8/639 |
| 4,750,912 | 6/1988 | Kuhn | 8/639 |

FOREIGN PATENT DOCUMENTS 3216788 11/1985 Fed. Rep. of Germany .

Primary Examiner—A. Lionel Clingman
Attorney, Agent, or Firm—Connolly and Hutz

[57] ABSTRACT

The mixture of monoazo dyestuffs which contains one or more dyestuffs of the formula I

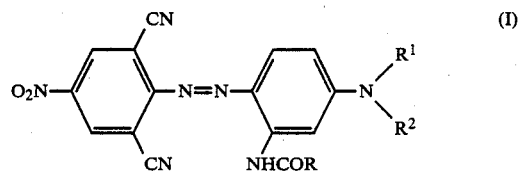

and one or more dyestuffs of the formula II

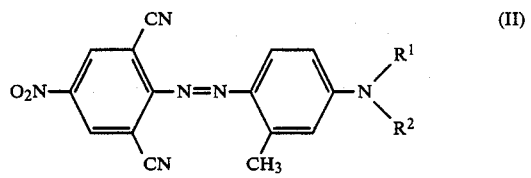

wherein $R^1$ and $R^2$ independently of one another denote linear or branched alkyl with 1 to 6 carbon atoms and R denotes linear or branched alkyl with 1 to 3 carbon atoms, is outstandingly suitable for dyeing and printing hydrophobic materials a deep blue color.

20 Claims, No Drawings

MIXTURES OF MONOAZO DYESTUFFS

The invention relates to mixtures of monoazo dyestuffs, which are characterized in that they consist of one or more dyestuffs of the formula I

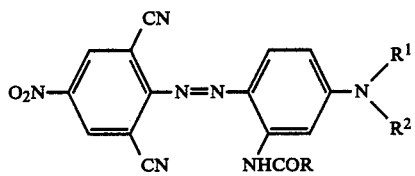

and one or more dyestuffs of the formula II

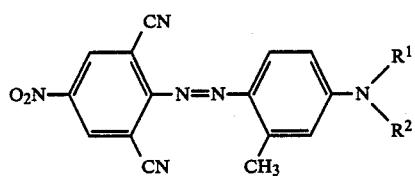

wherein $R^1$ and $R^2$ independently of one another denote Linear or branched alkyl with 1 to 6 C atoms and R denotes linear or branched alkyl with 1 to 3 C atoms.

The invention also relates to processes for the preparation of the dyestuff mixtures according to the invention and thier use for dyeing and printing hydrophobic fibre materials.

It is already known that mixtures of at least two different individual dyestuffs of the formula I have improved dyeing properties in comparison with the individual dyestuffs (compare German Auslegeschrift No. 2,234,465 (corresponding to U.S. Pat. No. 3,954,395), European Pat. No. 93,933 and German Offenlegungsschrift 3,347,572, corresponding to U.S. Pat. No. 4,689,050.

It has now been found, surprisingly, that the mixtures according to the invention have considerably improved dyeing properties in comparison with the individual dyestuffs and in some cases also in comparison with the mixtures of German Auslegeschrift No. 2,234,465 and European Pat. No. 93,935.

The dyestuff mixtures according to the invention consist of one or more dyestuffs of the formula I and one or more dyestuffs of the formula II. Dyestuff mixtures according to the invention which consist of one or two dyestuffs each of the formulae I and II are preferred.

Dyestuff mixtures which consist of dyestuffs of the formulae I and II wherein $R^1$ and $R^2$ denote linear alkyl with 2 to 4 C atoms and R denotes linear or branched akyl with 1 to 3 C atoms are also preferred. Dyestuff mixtures which consist of dyestuffs of the formulae I and II wherein $R^1$ and $R^2$ in one dyestuff are in each case identical and denote n-proply and, in particular, ethyl and which contain one or more dyestuffs of the formula I in which R denotes methyl, i-propyl or, in particular, n-propyl are those which contain at least 2 dyestuffs of the formula I in which the radicals R are different and two of these dyestuffs have the combinations, $CH_3/i-C_3H_7$, $C_2H_5/i-C_3H_7$, $C_2H_5/n-C_3H_7$, $i-C_3H_7/n-C_3H_7$ or, in particular, $CH_3/n-C_3H_7$ for R, the radicals $R^1$ and $R^2$ of all the dyestuffs of these mixtures representing linear alkly with 2 to 4 C atoms, and are preferably identical in each individual dyestuff and are especially preferably ethyl.

Dyestuff mixtures which contain at least 2 dyestuffs of the formula I in which the radicals R are in each case identical and denote ethyl, n-propyl, i-propyl or, in particular, methyl and the radicals $R^1$ and $R^2$, which are preferably identical in each of the individual dyestuffs, differ from dyestuff to dyestuff and have the combinations ethyl/n-butyl, propyl/-n-butyl or, in particular, ethyl/n-propyl, are furthermore preferred.

Mixtures which contain the dyestuff of the formula II known and where $R^1 = R^2 =$ ethyl and the dyestuffs of the formula I where $R^1 = R^2 =$ ethyl and R = methyl or n-propyl, or the dyestuffs of the formula I where R = methyl and $R^1 = R^2 =$ ethyl or n-propyl, or, in particular, the dyestuff of the formula I where $R^1 = R^2 =$ ehtyl and R = n-propyl, are especially preferred.

In the dyestuff mixtures according to the invention, the ratio of the various dyestuffs of the general formulae I and II can vary within relatively wide limits. In general, the minimum proportion by weight of one component is 10% and the maximum proportion by weight is 90%. In dyestuff mixtures which consist only of two dyestuffs of the general formulae I and II, an amount ratio of 70/30 to 30/70 is preferred, that is to say the proportion by weight of one dyestuff is 30 to 70%.

The individual dyestuffs of the formulae I and II are known and described, for example, in German Patent Specification No. 1,794,402 (corresponding to U.S. Pat. Nos. 3,962,209; 4,105,655 and 4,237,048) and European Patent Specification No. 36,512 (corresponding to U.S. Pat. No. 4,381,262).

The dyestuff mixtures according to the invention can be prepared by various processes.

1. By mixing the separately prepared and separately finished individual dyestuffs. This mixing process is carried out in suitable mixers, such as, for example, tumbler mixers.

2. By diazotization and common coupling, characterized in that an amine of the formula III

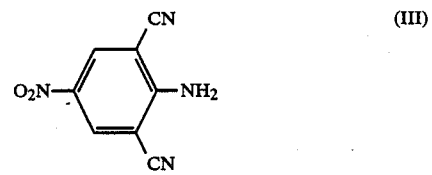

is diazotized and the diazotization product is coupled to a mixture of in each case at least one coupling component of the formulae IV or V

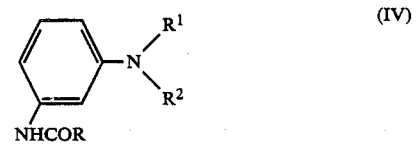

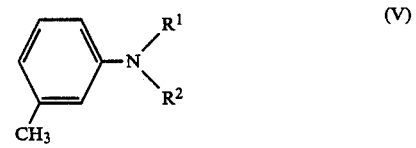

in which $R^1$, $R^2$ and R independently of one another have the abovementioned meanings. The composition of the mixture of the coupling components is thereby chosen such that the dyestuff mixtures according to the invention are formed. The diazotization and coupling are thereby carried out in a manner which is known per se, such as is customary for the preparation of individual dyestuffs and is described, for example, in Czech Patent Specification No. 164,657. The dyestuff mixtures thus prepared are then finished together.

Preferably 3: by common cyano exchange, characterized in that in dyestuff mixtures which consist of at least one dyestuff of the formula VI and at least one dyestuff of the formula VII

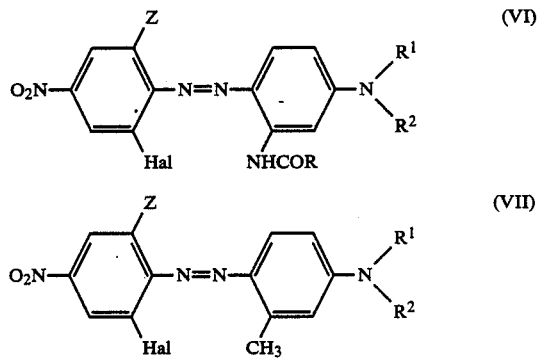

in which Z represents cyano or halogen and Hal represents halogen, preferably bromine, and $R^1$, $R^2$ and R have the abovementioned meanings, halogen is exchanged for cyano in a manner which is known per se, such as is described for individual dyestuffs, for example in British Patent Specification No. 1,125,685. The composition of the mixture of the dyestuffs of the formulae VI and VII is thereby chosen such that dyestuff mixtures according to the invention are formed.

The mixture of the dyestuffs of the formulae VI and VII can be prepared by mixing the individual dyestuffs of the formulae VI and VII. However, they can also be obtained by diazotizing a diazo component of the general formula VIII

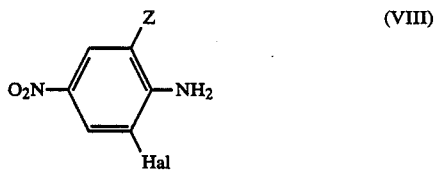

in which Z represents cyano or halogen and Hal represents bromine or chlorine, and Z and Hal preferably represent bromine, and coupling the diazotization product to a mixture of the coupling components of the general formulae IV and V.

Preferably 4: by common finishing of the separately prepared individual components.

This common finishing is characterized in that a dyestuff mixture of in each case at least one dyestuff of the general formulae I and II is ground in suitable mills, such as, for example, ball or sand mills, in the presence of dispersing agents and, if a pulverulent finished dyestuff is to be prepared, the mixture is then spray-dried.

Suitable dispersing agents are, for example, anionic or non-ionic dispersing agents, which can also be used together. Anionic dispersing agents are, for example, condensation products of aromatic sulphonic acids and formaldehyde, in particular condensation products of alkylnaphthalenesulphonic acids and formaldehyde, condensation products of optionally substituted phenol with formaldehyde and sodium bisulphite, alkali metal salts of condensation products of optionally substituted phenol, naphthalene-or naphtholsulphonic acids, formaldehyde and sodium bisulphite, alkali metal salts of condensation products of optionally substituted phenolsulponic acids, formaldehyde and urea, and alkali metal salts of ligninsulphonic acids; alkyl- or alkyl-aryl-sulphonates and alkyl-aryl-polyglycol ether-sulphates. Non-ionic dispersing agents or emulsifiers are, for example, reaction products of alkylene oxides, such as, for example, ethylene oxide or propylene oxide, with compounds which can be alkylated, such as, for example, fatty alcohols, fatty amines, fatty acids, phenols, alkylphenols, arylalkylphenols, arylalkylarylphenols and carboxylic acid amides, such as, for example, addition products of 5 to 10 units of ethylene oxide on $C_8$-$C_{10}$-alkylphenols.

Grinding is carried out at temperatures between 10° and 90° C., preferably at 30° to 60° C. In the case of common finishing of separately prepared individual components, common grinding at temperatures above 30° C. is advantageous. The dyestuff particles are thereby comminuted mechanically so that an optimum specific surface area is achieved and sedimentation of the dyestuff is as low as possible. The particle sizes of the dyestuffs are in general between 0.5 and 5 μm, preferably about 1 μm.

It is advantageous for the separately prepared individual components of the dyestuff mixture to be subjected to a common heat treatment before the common grinding. This heat treatment is characterized in that the individual components of the dyestuff mixture are heated at temperatures of 70° to 150° C., preferably 90° to 130° C., if appropriate under pressure, in water for half an hour to several hours and are then coled again.- This heating is advantgeously carried out in the presence of one or more dispersing agents or an organic solvent. Examples of such solvents are methanol, ethanol, dimethylformamide or dimethyl sulphoxide, but preferably solvents of low water-solubility, such as toluene, chlorobenzene, 1,2-dichlorobenzene or butyl acetate. These solvents are distilled off again after the heat treatment.

A preferred pretreatment of the individual components of the dyestuff mixture before common grinding is common dissolving of the individual components in an organic solvent or solvent mixture with subsequent crystallization or precipitation, isolation, for example by filtration, and removal of solvent residues, for example by washing.

The dyestuff dispersions thus obtained can very advantageously be used for preparation of printing pastes and dye liquors. They offer particular advantages, for example, in continuous processes in which the dyestuff concentration of the dye liquors must be kept constant by continuous feeding of dyestuff into the running apparatus.

Powder formulations are prefered for certain fields of use. These powders contain the dyestuff, dispersing agents and other auxiliaries, such as, for example, wetting agents, oxidizing agents, preservatives and dust removal agents. A preferred process for the preparation of pulverulent dyestuff formulations comprises removing the liquid from the liquid dyestuff dispersions described above, for example by vacuum drying, freeze-drying, drying on roller driers or, preferably, spray-drying.

The dyestuff contents of the liquid dyestuff formulations are 20 to 40%. The dispersing agent contents are about 10 to 40%. In powder formulations, the dyestuff contents are 20 to 60% and the dispersing agent contents are 40 to 80%. For economic reasons, the dyestuff content usually does not fall below 20%.

The dyestuff mixtures according to the invention are outstandingly suitable as such, or as a mixture with other disperse dyestuffs, for dyeing and printing hydrophobic synthetic fibre materials. Surprisingly, they are superior to the individual dyestuffs in respect of dyeing properties and coloristic fastnesses, such as, for example, thermomigration, fastness to thermofixing and fastness to water, washing and rubbing, in particular in build-up and exhaustion, and in levelling capacity. Moreover, outstandingly deep dyeings with excellent exhaustion of the bath are still obtained with the dyestuff mixtures according to the invention even when the dyeing temperatures are reduced and the dyeing time is shortened.

Possible hydrophobic synthetic materials are, for example; secondary cellulose acetate, cellulose triacetate, polyamides and, in particular, high molecular weight polyesters, such as, for example, polyethylene glycol terephthalate and mixtures thereof with natural fibre materials, such as, for example, cotton, regenerated cellulose fibres or wool.

To prepare the dye liquors, the required amounts of the dyestuff formulations which have been prepared in accordance with the above statements are diluted with the dyeing medium, preferably with water, so that a liquor ratio of 5:1 to 50:1 results for dyeing.

Other dyeing auxiliaries, such as dispersing agents, wetting agents and fixing auxiliaries, are in general also added to the liquors.

If the dyestuff is to be used for textile printing, the required amounts of the dyestuff formulations are kneaded together with thickeners, such as, for example, alkali metal alginates or the like, and if appropriate other additives, such as, for example, fixation accelerants, wetting agents and oxidizing agents, to form printing pastes.

The invention is illustrated in more detail by the following examples:

EXAMPLE 1

14.7 g of the dyestuff of the formula IX

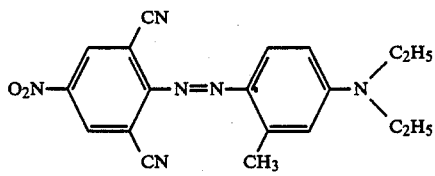

9.5 g of the dyestuff of the formula X

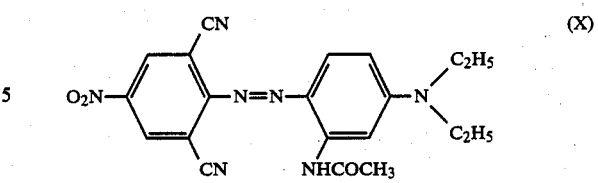

and 5.1 g of the dyestuff of the formula XI

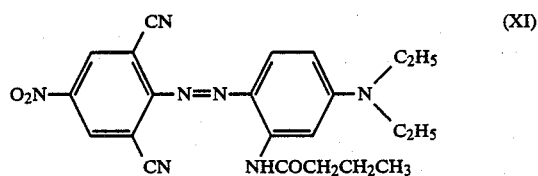

are homogenized together with 227.6 g of water, 86.8 g of a higher molecular weight ligninsulphonate and 6.3 g of an arylpolyglycol ether using a dissolver disc, and the pH is brought to 8.0 with 2.6 ml of 50% strength acetic acid. This mixture is then ground down to a fine division of <5 μm in a water-cooling bead mill and the resulting ground paste is sieved to remove the grinding agent and then dried with a spray-drier.

1.25 g of the dyestuff thus obtained are dispersed in 2,000 g of water. 4 g of ammonium sulphate, 2 g of a commercially available dispersing agent based on a condensation product of sodium naphthalenesulphonate and formaldehyde and 2 g of a condensation product of m-cresol, formaldehyde and sodium sulphite are added to the dispersion and the pH is brought to 5.5 with acetic acid. 100 g of a texturized polyester fabric based on polyethylene glycol terephthalate are introduced into the dye liquor thus obtained and dyeing is carried out at 120° C. for ½ hour. After subsequent rinsing, reductive after-treatment with a 0.2% strength sodium dithionite solution at 70° to 80° C. for 15 minutes, rinsing and drying, a deep blue dyeing with outstanding coloristic properties is obtained.

If a further 100 g of a texturized polyester fabric based on polyethylene glycol terephthalate is introduced into the dyebath to carry out an exhaustion test, dyeing is carried out at 135° C. for 1 hour and the fabric from the exhaustion test is after-treated as described for the actual dyeing, an almost colourless dyeing is obtained.

EXAMPLE 2

In each case 14.7 g of the dyestuffs of the formulae IX and XI are brought to a pH of 5.9 together in 243.7 g of water with 43.6 g of sodium ligninsulphonate and 12.6 g of a non-ionic dispersing agent based on arylpolyglcol ether (4-((4'benzyl-) phenyl)-phenol+15 ethylene oxide units) using 50% strength acetic acid and are homogenized with a toothed stirrer. The resulting dispersion is then heated to 100° C. in an autoclave in the course of 2 hours and stirred at this temperature for 2 hours. After cooling, 43.6 g of a condensation product of cresol, formaldehyde and sodium naphthol-2-sulphonate are added and the dispersion is brought to pH 8.0 with 50% strength acetic acid. The mixture is then ground down to a fine division (80%≦1 μm) in a bead mill at room temperature for 2 hours, sieved and sprayed in a spray-drier. The dyestuff powder is then used for dyeing.

0.12 g of the dyestuff powder thus prepared is stirred into 250 ml of water, 0.4 g of a commercially available dispersing agent based on a condensation product of m-cresol, formaldehyde and sodium sulphite, 0.8 g of a commercially available carrier based on methylnaphthalene, 0.8 g of crystalline sodium acetate and 1.2 ml of 30% strength acetic acid are added, with stirring, and the mixture is made up to 400 ml with water. The pH of the dyebath is 4.5. 10 g of a polyester fabric based on polyethylene glycol terephthalate are introduced into this dyebath. The fabric is dyed at 95° C. in an open vessel for 90 minutes and the dyed material is removed, rinsed, reduction cleared with alkaline 0.2% strength sodium dithionite solution (15 minutes at 60° to 70° C.), rinsed again and dried. A deep blue dyeing with outstanding coloristic properties is thereby obtained.

Material dyed in an exhaustion test at 135° C. for ½ hour is almost colourless.

EXAMPLE 3

17.6 g of the dyestuff of the formula IX and 11.7 g of the dyestuff of the formula X are converted into a dyestuff powder as described in Example 1.

0.12 g of the dyestuff powder thus prepared is stirred into 200 ml of water, and 0.2 g of a commercially available dispersing agent based on a condensation product of m-cresol, formaldehyde and sodium sulphite, 0.3 g of a commercially available carrier based on methylnaphthalene, 0.4 g of crystalline sodium acetate and 1.2 ml of 30% strength acetic acid are added, with stirring. The pH of the dyebath is 4.5. 10 g of a polyeters fabric based on polyethylene glycol terephthalate are introduced into this dyebath and dyeing is carried out in a dyeing bomb at 106° C. under pressure for one hour. The fabric is finished, as described above, by rinsing, reductive after-treatment, renewed rinsing and drying and a deep blue dyeing with very good coloristic fastness properties is likewise obtained.

The following table gives other dyestuff mixtures according to the invention which have the meanings of R, $R^1$ and $R^2$ and the weight ratio of the individual dyestuffs shown, and can be prepared in accordance with the above statements and likewise give deep blue dyeings or prints similarly with very good coloristic properties on polyester materials.

| EXAMPLE | DYESTUFF | $R^1$ | $R^2$ | R | WEIGHT RATIO |
|---|---|---|---|---|---|
| 4 | I | $C_2H_5$ | $C_2H_5$ | $n\text{-}C_3H_7$ | 80 |
|   | II | $C_2H_5$ | $C_2H_5$ | — | 20 |
| 5 | I | $C_2H_5$ | $C_2H_5$ | $CH_3$ | 20 |
|   | I | $C_2H_5$ | $C_2H_5$ | $n\text{-}C_3H_7$ | 20 |
|   | II | $C_2H_5$ | $C_2H_5$ | — | 60 |
| 6 | I | $C_2H_5$ | $C_2H_5$ | $C_2H_5$ | 50 |
|   | II | $C_2H_5$ | $C_2H_5$ | — | 50 |
| 7 | I | $C_2H_5$ | $C_2H_5$ | $i\text{-}C_3H_7$ | 70 |
|   | II | $C_2H_5$ | $C_2H_5$ | — | 30 |
| 8 | I | $C_2H_5$ | $C_2H_5$ | $CH_3$ | 33⅓ |
|   | I | $C_2H_5$ | $C_2H_5$ | $i\text{-}C_3H_7$ | 33⅓ |
|   | II | $C_2H_5$ | $C_2H_5$ | — | 33⅓ |
| 9 | I | $C_2H_5$ | $C_2H_5$ | $C_2H_5$ | 10 |
|   | I | $C_2H_5$ | $C_2H_5$ | $n\text{-}C_3H_7$ | 40 |
|   | II | $C_2H_5$ | $C_2H_5$ | — | 50 |
| 10 | I | $C_2H_5$ | $C_2H_5$ | $C_2H_5$ | 40 |
|    | I | $C_2H_5$ | $C_2H_5$ | $i\text{-}C_3H_7$ | 40 |
|    | II | $C_2H_5$ | $C_2H_5$ | — | 20 |
| 11 | I | $C_2H_5$ | $C_2H_5$ | $CH_3$ | 20 |
|    | I | $C_2H_5$ | $C_2H_5$ | $C_2H_5$ | 20 |
|    | II | $C_2H_5$ | $C_2H_5$ | — | 60 |
| 12 | I | $C_2H_5$ | $C_2H_5$ | $n\text{-}C_3H_7$ | 30 |
|    | I | $C_2H_5$ | $C_2H_5$ | $i\text{-}C_3H_7$ | 30 |
|    | II | $C_2H_5$ | $C_2H_5$ | — | 40 |
| 13 | I | $C_2H_5$ | $C_2H_5$ | $CH_3$ | 20 |
|    | I | $C_2H_5$ | $C_2H_5$ | $n\text{-}C_3H_7$ | 20 |
|    | I | $C_2H_5$ | $C_2H_5$ | $i\text{-}C_3H_7$ | 20 |
|    | II | $C_2H_5$ | $C_2H_5$ | — | 40 |
| 14 | I | $C_2H_5$ | $C_2H_5$ | $CH_3$ | 10 |
|    | I | $n\text{-}C_3H_7$ | $n\text{-}C_3H_7$ | $CH_3$ | 30 |
|    | II | $C_2H_5$ | $C_2H_5$ | — | 60 |
| 15 | I | $C_2H_5$ | $C_2H_5$ | $CH_3$ | 20 |
|    | I | $n\text{-}C_3H_7$ | $n\text{-}C_3H_7$ | $CH_3$ | 20 |
|    | II | $C_2H_5$ | $C_2H_5$ | — | 60 |
| 16 | I | $C_2H_5$ | $C_2H_5$ | $CH_3$ | 35 |
|    | I | $n\text{-}C_3H_7$ | $n\text{-}C_3H_7$ | $CH_3$ | 35 |
|    | II | $C_2H_5$ | $C_2H_5$ | — | 30 |
| 17 | I | $C_2H_5$ | $C_2H_5$ | $C_2H_5$ | 40 |
|    | I | $n\text{-}C_3H_7$ | $n\text{-}C_3H_7$ | $C_2H_5$ | 20 |
|    | II | $C_2H_5$ | $C_2H_5$ | — | 40 |
| 18 | I | $C_2H_5$ | $C_2H_5$ | $n\text{-}C_3H_7$ | 60 |
|    | I | $n\text{-}C_3H_7$ | $n\text{-}C_3H_7$ | $n\text{-}C_3H_7$ | 10 |
|    | II | $C_2H_5$ | $C_2H_5$ | — | 30 |
| 19 | I | $C_2H_5$ | $C_2H_5$ | $n\text{-}C_3H_7$ | 30 |
|    | I | $n\text{-}C_3H_7$ | $n\text{-}C_3H_7$ | $CH_3$ | 30 |
|    | II | $C_2H_5$ | $C_2H_5$ | — | 40 |
| 20 | I | $C_2H_5$ | $C_2H_5$ | $C_2H_5$ | 60 |
|    | I | $n\text{-}C_3H_7$ | $n\text{-}C_3H_7$ | $CH_3$ | 30 |
|    | II | $C_2H_5$ | $C_2H_5$ | — | 10 |
| 21 | I | $C_2H_5$ | $C_2H_5$ | $i\text{-}C_3H_7$ | 30 |
|    | I | $n\text{-}C_3H_7$ | $n\text{-}C_3H_7$ | $CH_3$ | 30 |
|    | II | $C_2H_5$ | $C_2H_5$ | — | 40 |
| 22 | I | $n\text{-}C_3H_7$ | $n\text{-}C_3H_7$ | $CH_3$ | 40 |
|    | II | $C_2H_5$ | $C_2H_5$ | — | 60 |
| 23 | I | $n\text{-}C_3H_7$ | $n\text{-}C_3H_7$ | $CH_3$ | 25 |
|    | II | $C_2H_5$ | $C_2H_5$ | — | 75 |
| 24 | I | $n\text{-}C_3H_7$ | $n\text{-}C_3H_7$ | $n\text{-}C_3H_7$ | 50 |
|    | II | $C_2H_5$ | $C_2H_5$ | — | 50 |
| 25 | I | $n\text{-}C_3H_7$ | $n\text{-}C_3H_7$ | $C_2H_5$ | 65 |
|    | II | $C_2H_5$ | $C_2H_5$ | — | 35 |
| 26 | I | $n\text{-}C_3H_7$ | $n\text{-}C_3H_7$ | $i\text{-}C_3H_7$ | 40 |
|    | II | $C_2H_5$ | $C_2H_5$ | — | 60 |
| 27 | I | $n\text{-}C_3H_7$ | $n\text{-}C_3H_7$ | $n\text{-}C_3H_7$ | 10 |
|    | I | $C_2H_5$ | $C_2H_5$ | $n\text{-}C_3H_7$ | 15 |
|    | I | $n\text{-}C_3H_7$ | $n\text{-}C_3H_7$ | $CH_3$ | 10 |
|    | I | $C_2H_5$ | $C_2H_5$ | $CH_3$ | 10 |
|    | II | $C_2H_5$ | $C_2H_5$ | — | 55 |
| 28 | I | $n\text{-}C_4H_9$ | $n\text{-}C_4H_9$ | $CH_3$ | 50 |
|    | II | $C_2H_5$ | $C_2H_5$ | — | 50 |
| 29 | I | $n\text{-}C_4H_9$ | $n\text{-}C_4H_9$ | $C_2H_5$ | 45 |
|    | II | $C_2H_5$ | $C_2H_5$ | — | 55 |
|    | I | $C_2H_5$ | $C_2H_5$ | $CH_3$ | 30 |
| 30 | I | $n\text{-}C_4H_9$ | $n\text{-}C_4H_9$ | $CH_3$ | 10 |
|    | II | $C_2H_5$ | $C_2H_5$ | — | 60 |
| 31 | I | $n\text{-}C_4H_9$ | $n\text{-}C_4H_9$ | $CH_3$ | 5 |
|    | I | $C_2H_5$ | $C_2H_5$ | $n\text{-}C_3H_7$ | 55 |
|    | II | $C_2H_5$ | $C_2H_5$ | — | 40 |
| 32 | I | $n\text{-}C_5H_{11}$ | $n\text{-}C_5H_{11}$ | $CH_3$ | 30 |
|    | II | $C_2H_5$ | $C_2H_5$ | — | 70 |
| 33 | I | $n\text{-}C_6H_{13}$ | $n\text{-}C_6H_{13}$ | $CH_3$ | 25 |
|    | II | $C_2H_5$ | $C_2H_5$ | — | 75 |
| 34 | I | $C_2H_5$ | $C_2H_5$ | $n\text{-}C_3H_7$ | 45 |
|    | II | $n\text{-}C_3H_7$ | $n\text{-}C_3H_7$ | — | 55 |
| 35 | I | $C_2H_5$ | $C_2H_5$ | $CH_3$ | 70 |
|    | II | $n\text{-}C_3H_7$ | $n\text{-}C_3H_7$ | — | 30 |
| 36 | I | $C_2H_5$ | $C_2H_5$ | $CH_3$ | 30 |
|    | I | $C_2H_5$ | $C_2H_5$ | $n\text{-}C_3H_7$ | 10 |
|    | II | $C_2H_5$ | $C_2H_5$ | — | 60 |
| 37 | I | $C_2H_5$ | $C_2H_5$ | $C_2H_5$ | 60 |
|    | II | $n\text{-}C_3H_7$ | $n\text{-}C_3H_7$ | — | 40 |
| 38 | I | $C_2H_5$ | $C_2H_5$ | $i\text{-}C_3H_7$ | 50 |
|    | II | $n\text{-}C_3H_7$ | $n\text{-}C_3H_7$ | — | 50 |
| 39 | I | $n\text{-}C_3H_7$ | $n\text{-}C_3H_7$ | $CH_3$ | 20 |
|    | II | $n\text{-}C_3H_7$ | $n\text{-}C_3H_7$ | — | 80 |
| 40 | I | $C_2H_5$ | $C_2H_5$ | $CH_3$ | 25 |
|    | I | $n\text{-}C_3H_7$ | $n\text{-}C_3H_7$ | $CH_3$ | 25 |
|    | II | $n\text{-}C_3H_7$ | $n\text{-}C_3H_7$ | — | 50 |
| 41 | I | $C_2H_5$ | $C_2H_5$ | $CH_3$ | 30 |
|    | I | $C_2H_5$ | $C_2H_5$ | $i\text{-}C_3H_7$ | 40 |
|    | II | $n\text{-}C_3H_7$ | $n\text{-}C_3H_7$ | — | 30 |
| 42 | I | $C_2H_5$ | $C_2H_5$ | $CH_3$ | 30 |
|    | I | $C_2H_5$ | $C_2H_5$ | $C_2H_5$ | 30 |
|    | II | $n\text{-}C_3H_7$ | $n\text{-}C_3H_7$ | — | 40 |

-continued

| EXAMPLE | DYESTUFF | R¹ | R² | R | WEIGHT RATIO |
|---|---|---|---|---|---|
| 43 | I | C₂H₅ | C₂H₅ | n-C₃H₇ | 70 |
|  | II | n-C₄H₉ | n-C₄H₉ | — | 30 |
| 44 | I | C₂H₅ | C₂H₅ | CH₃ | 45 |
|  | II | n-C₄H₉ | n-C₄H₉ | — | 55 |
| 45 | I | C₂H₅ | C₂H₅ | CH₃ | 25 |
|  | I | C₂H₅ | C₂H₅ | n-C₃H₇ | 50 |
|  | II | n-C₄H₉ | n-C₄H₉ | — | 25 |
| 46 | I | C₂H₅ | C₂H₅ | CH₃ | 30 |
|  | I | C₂H₅ | C₂H₅ | n-C₃H₇ | 30 |
|  | II | n-C₅H₁₁ | n-C₅H₁₁ | — | 40 |
| 47 | I | C₂H₅ | C₂H₅ | CH₃ | 65 |
|  | I | n-C₃H₇ | n-C₃H₇ | CH₃ | 15 |
|  | II | n-C₆H₁₃ | n-C₆H₁₃ | — | 20 |
| 48 | I | CH₃ | CH₃ | C₂H₅ | 50 |
|  | II | C₂H₅ | C₂H₅ | — | 50 |
| 49 | I | CH₃ | CH₃ | n-C₃H₇ | 35 |
|  | II | C₂H₅ | C₂H₅ | — | 65 |
| 50 | I | CH₃ | CH₃ | CH₃ | 33⅓ |
|  | I | CH₃ | CH₃ | n-C₃H₇ | 33⅓ |
|  | II | CH₃ | CH₃ | — | 33⅓ |
| 51 | I | C₂H₅ | C₂H₅ | n-C₃H₇ | 75 |
|  | II | CH₃ | CH₃ | — | 25 |
| 52 | I | C₂H₅ | C₂H₅ | CH₃ | 30 |
|  | II | C₂H₅ | C₂H₅ | — | 35 |
|  | II | n-C₃H₇ | n-C₃H₇ | — | 35 |
| 53 | I | C₂H₅ | C₂H₅ | C₂H₅ | 30 |
|  | II | C₂H₅ | C₂H₅ | — | 45 |
|  | II | n-C₄H₉ | n-C₄H₉ | — | 25 |
| 54 | I | C₂H₅ | C₂H₅ | n-C₃H₇ | 50 |
|  | II | n-C₃H₇ | n-C₃H₇ | — | 25 |
|  | II | n-C₄H₉ | n-C₄H₉ | — | 25 |
| 55 | I | C₂H₅ | C₂H₅ | n-C₃H₇ | 35 |
|  | II | CH₃ | CH₃ | — | 30 |
|  | II | C₂H₅ | C₂H₅ | — | 35 |
| 56 | I | C₂H₅ | C₂H₅ | n-C₃H₇ | 20 |
|  | II | C₂H₅ | C₂H₅ | — | 40 |
|  | II | n-C₃H₇ | n-C₃H₇ | — | 40 |
| 57 | I | C₂H₅ | C₂H₅ | C₂H₅ | 25 |
|  | II | C₂H₅ | C₂H₅ | — | 50 |
|  | II | n-C₃H₇ | n-C₃H₇ | — | 25 |
| 58 | I | C₂H₅ | C₂H₅ | i-C₃H₇ | 50 |
|  | II | CH₃ | CH₃ | — | 25 |
|  | II | n-C₄H₉ | n-C₄H₉ | — | 25 |
| 59 | I | C₂H₅ | n-C₃H₇ | CH₃ | 33⅓ |
|  | II | C₂H₅ | C₂H₅ | — | 66⅔ |
| 60 | I | CH₃ | n-C₄H₉ | C₂H₅ | 50 |
|  | II | C₂H₅ | C₂H₅ | — | 50 |
| 61 | I | CH₃ | n-C₃H₇ | n-C₃H₇ | 45 |
|  | II | C₂H₅ | C₂H₅ | — | 55 |
| 62 | I | C₂H₅ | C₂H₅ | CH₃ | 40 |
|  | II | C₂H₅ | n-C₃H₇ | — | 60 |
| 63 | I | C₂H₅ | C₂H₅ | C₂H₅ | 50 |
|  | II | CH₃ | n-C₃H₇ | — | 50 |
| 64 | I | C₂H₅ | i-C₃H₇ | CH₃ | 30 |
|  | II | C₂H₅ | C₂H₅ | — | 70 |
| 65 | I | C₂H₅ | i-C₃H₇ | n-C₃H₇ | 35 |
|  | II | C₂H₅ | C₂H₅ | — | 65 |
| 66 | I | CH₃ | i-C₃H₇ | C₂H₅ | 50 |
|  | II | n-C₃H₇ | n-C₃H₇ | — | 50 |
| 67 | I | C₂H₅ | C₂H₅ | CH₃ | 40 |
|  | II | CH₃ | i-C₃H₇ | — | 60 |
| 68 | I | n-C₃H₇ | n-C₃H₇ | CH₃ | 35 |
|  | II | C₂H₅ | i-C₃H₇ | — | 65 |
| 69 | I | C₂H₅ | i-C₃H₇ | C₂H₅ | 60 |
|  | II | C₂H₅ | i-C₃H₇ | — | 40 |
| 70 | I | C₂H₅ | i-C₃H₇ | CH₃ | 40 |
|  | I | C₂H₅ | i-C₃H₇ | n-C₃H₇ | 40 |
|  | II | C₂H₅ | i-C₃H₇ | — | 20 |
| 71 | I | CH₃ | i-C₄H₉ | C₂H₅ | 33⅓ |
|  | II | CH₃ | i-C₄H₉ | — | 33⅓ |
|  | II | C₂H₅ | i-C₄H₉ | — | 33⅓ |
| 72 | I | C₂H₅ | C₂H₅ | n-C₃H₇ | 50 |
|  | II | CH₃ | i-C₅H₁₁ | — | 50 |

What is claimed is:

1. A mixture of monoazo dyestuffs which comprises one or more dyestuffs of the formula I

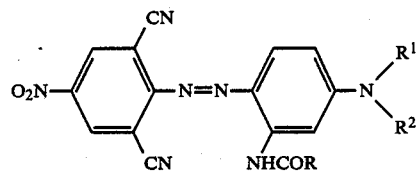

and one or more dyestuffs of the formula II

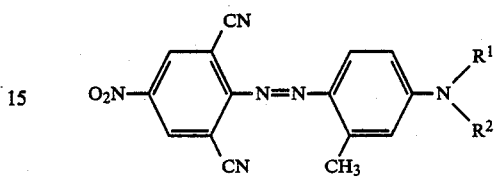

wherein $R^1$ and $R^2$ independently of one another each denote linear or branched alkyl with 1 to 6 carbon atoms and R denotes linear or branched alkyl with 1 to 3 carbon atoms.

2. A dyestuff mixture according to claim 1 wherein the weight proportion of a dyestuff of the formula I or II is 10 to 90%.

3. A dyestuff mixture according to claim 1 wherein the weight proportion of a dyestuff of the formulae I or II is 30 to 70%.

4. A dyestuff mixture according to claim 1 which contains one or two dyestuffs each of the formulae I and II.

5. A dyestuff mixture according to claim 1 wherein $R^1$ and $R^2$ denote linear alkyl with 2 to 4 carbon atoms and R denotes alkyl 1 to 3 carbon atoms.

6. A dyestuff mixture according to claim 1 wherein at least one of the dyestuffs or the formulae I or II has for both $R^1$ and $R^2$ n-propyl and which contains one or more dyestuffs of the formula I in which R denotes methyl, i-propyl or n-propyl.

7. A dyestuff mixture according to claim 6 wherein R is n-propyl.

8. A dyestuff mixture according to claim 1 wherein at least one of the dyestuffs of the formulae I or II has for both $R^1$ and $R^2$ ethyl and which contains one or more dyestuffs of the formula I in which R denotes methyl, i-propyl or n-propyl.

9. A dyestuff mixture according to claim 8 wherein R is n-propyl.

10. A dyestuff mixture according to claim 1 which contains at least two dyestuffs of the formula I in which the R moieties are different and two of these dyestuffs have for R the combinations methyl/i-propyl, ethyl/i-propyl, ethyl/n-propyl, i-propyl/n-propyl or methyl/n-propyl.

11. A dyestuff mixture according to claim 10 wherein the two dyestuffs of the formula I denote R as methyl/n-propyl.

12. A dyestuff mixture according to claim 10 wherein $R^1$ and $R^2$ are the same moiety.

13. A dyestuff mixture according to claim 10 wherein $R^1$ and $R^2$ are both ethyl.

14. A dyestuff mixture according to claim 2 which contains at least two dyestuffs of the formula I in which the R moieties are in each identical and denote methyl, ethyl, n-propyl or i-propyl and the $R^1$ and $R^2$ moieties are identical on each individual dyestuff of formula I or II but differ from dyestuff I to dyestuff II and have the combinations ethyl/n-butyl, propyl/n-butyl or ethyl/n-propyl.

15. A deystuff mixture according to claim 14 wherein R is methyl and $R^1/R^2$ is ethyl/n-propyl.

16. A deystuff mixture according to claim 1 wherein for the dyestuff of formula II, $R^1$ and $R^2$ are both ethyl and in the dyestuffs of formula I $R^1$ and $R^2$ and ethyl or n-propyl and R is methyl or n-propyl.

17. A dyestuff mixture according to claim 16 wherein for the dyestuff of formula I, $R^1$ and $R^2$ are both ethyl and R is n-propyl.

18. Process for the preparation of the dyestuff mixture according to claim 1 which comprises diazotizing an amine of the formula

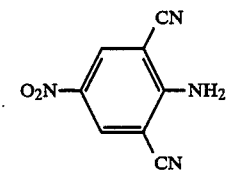

and coupling the diazotized amine to a mixture of coupling components of the formulae

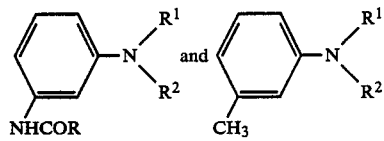

19. Process for the preparation of the dyestuff mixture according to claim 1 wherein a dyestuff mixture of at least one dyestuff of each of the formulae

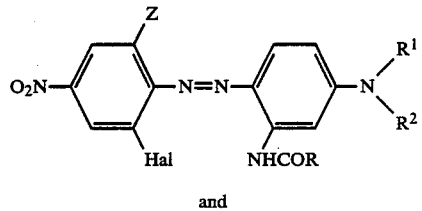

and

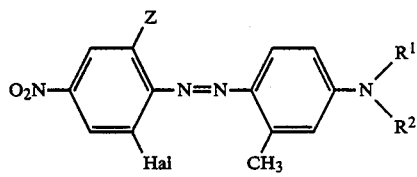

wherein Z represents cyano or halogen and Hal represents halogen, is subjected to cyano replacement of halogen.

20. In the process for dyeing and printing hydrophobic fiber materials and mixtures thereof with natural fibers or regenerated cellulose fibers by applying thereto an azo dyestuffs, The improvement comprises said azo dyestuff being a dyestuff mixture according to claim 1.

* * * * *

UNITED STATES PATENT AND TRADEMARK OFFICE
CERTIFICATE OF CORRECTION

PATENT NO. : 4,872,883

DATED : October 10, 1989

INVENTOR(S) : BUHLER ET AL

It is certified that error appears in the above-identified patent and that said Letters Patent is hereby corrected as shown below:

On the face of the patent, item [73], after "Assignee:", replace "Bayer Aktiengesellschaft, Bayerwerk" with --Cassella Aktiengesellschaft, Frankfurt am Main--.

Signed and Sealed this

Fifth Day of February, 1991

Attest:

HARRY F. MANBECK, JR.

Attesting Officer

Commissioner of Patents and Trademarks